(12) United States Patent
Hayashi

(10) Patent No.: US 6,385,846 B1
(45) Date of Patent: May 14, 2002

(54) METHOD FOR REMOVING AN OIL SEAL

(75) Inventor: Mikio Hayashi, Tokyo (JP)

(73) Assignee: Hayashiseiko Kabushikikaisha, Tokyo (JP)

( * ) Notice: Subject to any disclaimer, the term of this patent is extended or adjusted under 35 U.S.C. 154(b) by 0 days.

(21) Appl. No.: 09/703,155

(22) Filed: Oct. 31, 2000

(51) Int. Cl.$^7$ ............................................. B23P 15/00
(52) U.S. Cl. ........................... 29/888.01; 29/888.08; 29/426.4
(58) Field of Search ................ 29/888.011, 888.08, 29/426.4, 402.03, 402.08, 402.02, 426.1

(56) References Cited

U.S. PATENT DOCUMENTS

| | | | |
|---|---|---|---|
| 5,181,308 A | * | 1/1993 | Gray et al. ............ 29/888.011 |
| 5,539,979 A | * | 7/1996 | Powers ................ 29/888.011 |
| 5,845,397 A | * | 12/1998 | Reedy et al. .......... 29/888.011 |

FOREIGN PATENT DOCUMENTS

| | | |
|---|---|---|
| JP | S61-184672 | 11/1986 |
| JP | H3-77862 | 8/1991 |

* cited by examiner

*Primary Examiner*—I Cuda-Rosenbaum
(74) *Attorney, Agent, or Firm*—Koda & Androlia

(57) ABSTRACT

To provide an oil seal removing method that may dispense with a step for forming a hole to an iron core in the oil seal by using a drill and may be applied, as desired, even in a narrow space, and to provide a seal removal tool that is superior in versatility to a taper screw type tool screwed into an inner diameter portion of the oil seal, an L-shaped jaw (2) formed with arcuate portions (2a and 2a') at its tip end portion, and a retainer plate (1) with holes (3) at its body portion is prepared. The L-shaped jaw (2) is pressingly inserted into a contact interface between an oil seal body (6) and a crankshaft (5). Next, the retainer plate is tilted through 90 degrees to engage the jaw (2) with an end face of the iron core (10). Next, a tip (tip end) (4') of a driver (4) is inserted into the hole (3), and a grip of a lever is drawn as indicated by an arrow (9) while abutting the tip (tip end) (4') against an end face (5c) of a pulley shaft. Thus, it is possible to draw the body (6) of the oil seal in an axial direction.

1 Claim, 4 Drawing Sheets

METHOD FOR REMOVING AN OIL SEAL

BACKGROUND OF THE INVENTION

1. Field of the Invention

The present invention relates to a method for removing an oil seal.

2. Description of the Related Art

As shown in FIG. 6, a conventional technology for removing an oil seal away from a crankshaft is to form a hole in a middle portion of an end face of an iron core 10 within the oil seal by using an electric drill, to screw an iron plate screw 11 into the hole and to push an oil seal body outwardly by a repulsive pressure generated at the tip end of the iron plate screw. However, in this case, since there is no space for using the electric drill, there were only methods in which the engine would be dismounted from the vehicle body or the radiator would be removed.

Furthermore, even if conducting the method as described above, according to a type of an oil seal, in some cases, there is no flange width for which the drill machining is possible at the end face of the iron core. In such cases, it is impossible to apply the above-described removing method.

A tool shown in FIG. 7 is next used as another method. Namely, this method is to prepare a pipe 12 having an inner diameter that is equal to a seal diameter of the crankshaft 5, to provide a taper screw 13 at its outer end portion, to firmly threadedly insert this into the inner diameter portion of the oil seal body 6 and to thereafter extrude the oil seal body 6 by a push screw 14 provided at a central portion of the pipe. As a defect in this case, it is necessary to separately provide a dedicated tool that is identified with the seal diameter of the crankshaft for each engine, resulting in inconvenience such as being not capable of applying to a general-purpose.

As described above, each of the conventional methods has each defect. As a result, there has been a necessary for attaining improvements.

SUMMARY OF THE INVENTION

In view of the foregoing defects inherent in the prior art, an object of the present invention is to provide a less expensive oil seal removing method that is superior in workability and versatility in general and may readily and very quickly remove the body of the oil seal even in a narrow space.

According to the present invention, in order to attain the above objects, there is provided a method for removing an oil seal away from a crankshaft, comprising forming symmetrical tip end portions which are tapered toward its end in a short side direction to an over-half front portion in a longitudinal direction of an narrow plate member, providing an L-shaped jaw 2 with arcuate portions 2a and 2a' on side surfaces in its thickness direction at its tip end portion, providing a retainer plate 1 provided with holes 3 passing through its surface in its width direction in an over-half rear portion in the longitudinal direction of above plate portion, and using this retainer plate 1 for removing the oil seal away from the crankshaft, characterized by comprising the steps of: raising said retainer plate 1 vertically to an axis of the crankshaft 5 with its jaw side facing down; pushing the jaw 2 into a contact interface between the oil seal body 6 and the crankshaft 5; tilting the retainer plate 1 to a position in parallel with the axis of the crankshaft 5 to raise the jaw 2, inserting a tip end 4' of a driver into the hole 3 of the retainer plate 1 to retain it to the end face 5c of the crankshaft 5; moving the oil seal body 6 in a direction for removing the crankshaft 5 by rotating a grip of the driver 4 in a direction for removing the oil seal body 6 while engaging the jaw 2 with an inner end face of an iron core 10 of the oil seal body 6; and thereby removing the oil seal body 6 away from the crankshaft 5.

DESCRIPTION OF THE PREFERRED EMBODIMENTS

Figure 1:
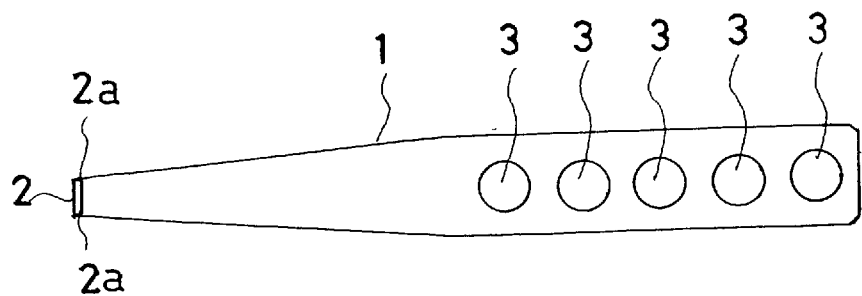
FIG. 1 is a plan view of a retainer plate according to an embodiment of the present invention.
Figure 2:
FIG. 2 is a side elevational view of the retainer plate shown in FIG. 1.
Figure 3:
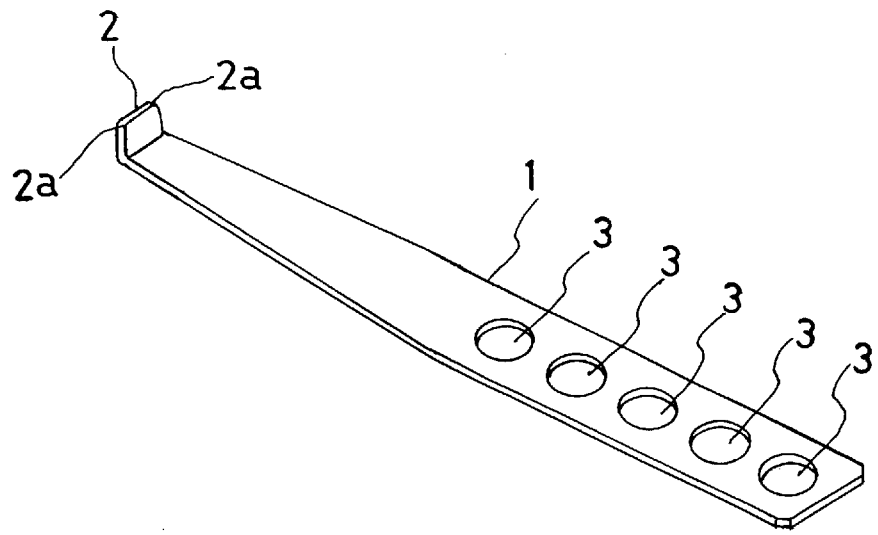
FIG. 3 is a perspective view of the retainer plate shown in FIG. 1.
Figure 4:
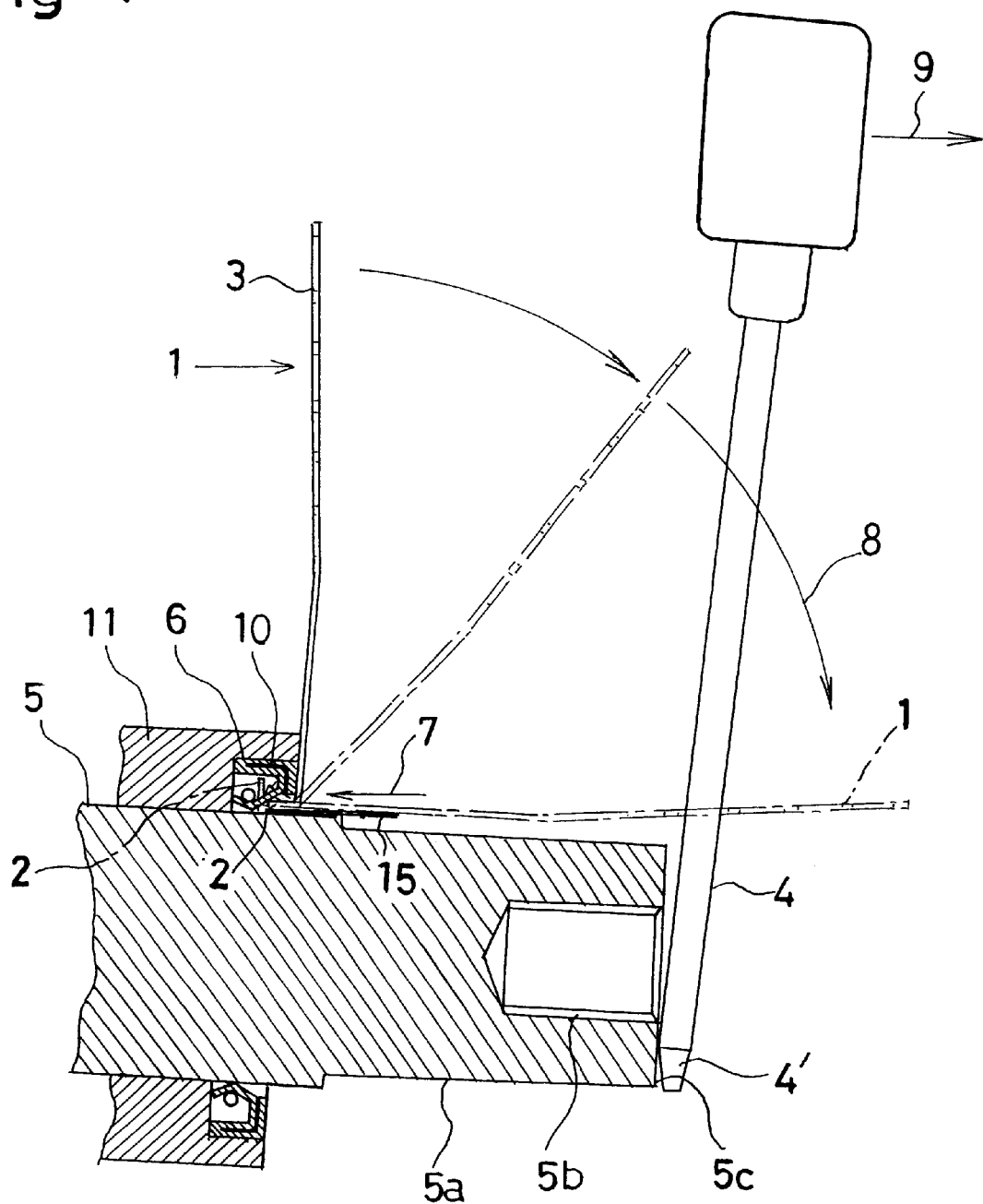
FIG. 4 is a longitudinal sectional view of the retainer plate according to the embodiment of the present invention.
Figure 5:
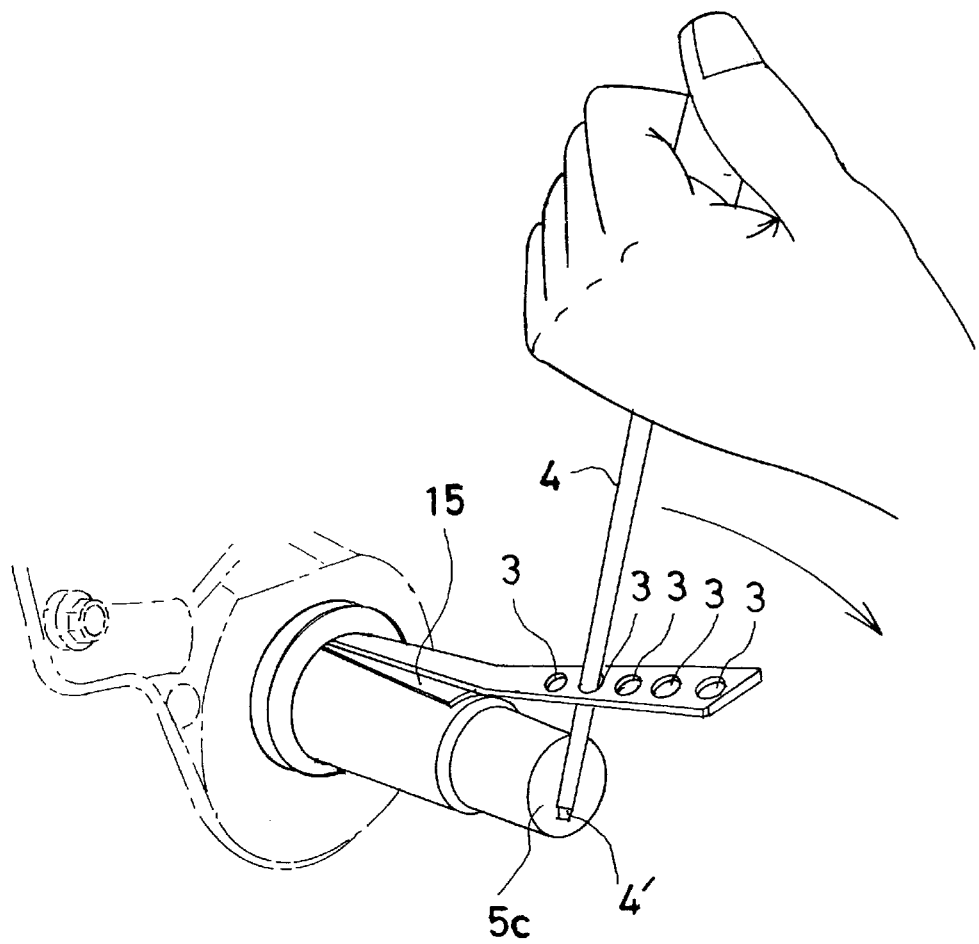
FIG. 5 is a view illustrating an operation of the invention.
Figure 6:
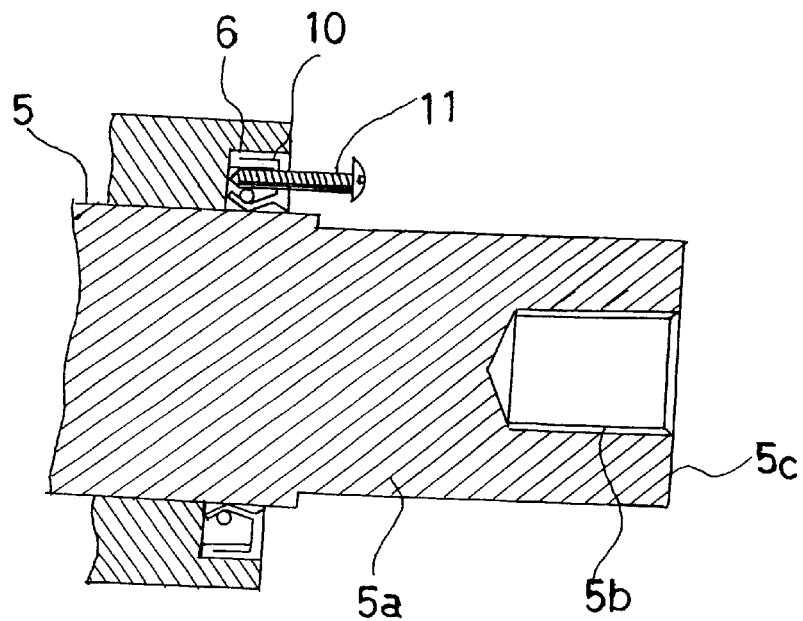
FIG. 6 is a longitudinal sectional view showing a conventional example.
Figure 7:
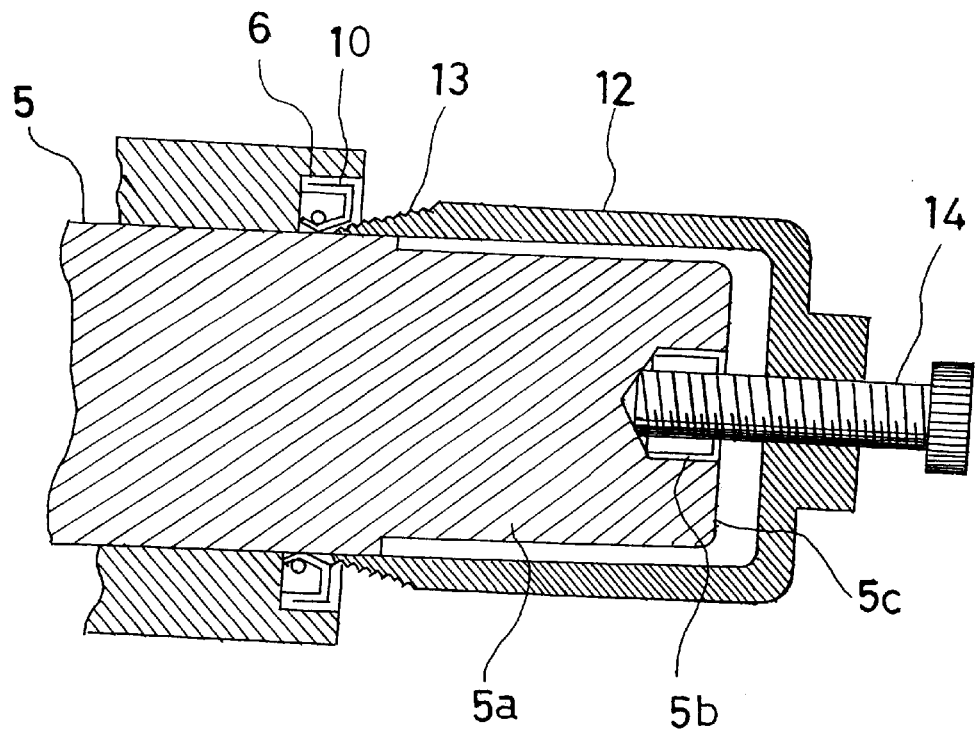
FIG. 7 is a longitudinal sectional view showing another conventional example.

The present invention will now be described with reference to the accompanying drawings.

According to the present invention, there is provided a method for removing an oil seal in an axial direction of a crankshaft (5), comprising: forming symmetrical tip end portions, which are tapered toward its tip end, at an over-half front portion in a longitudinal direction of an elongated plate member; providing an L-shaped jaw (2) with side surfaces formed into arcuate portions (2a and 2a'); forming a retainer plate 1 provided with holes (3) passing through its surface in its width direction at an over-half rear portion in the longitudinal direction of the plate portion; and spreading over a Teflon sheet or the same hard sheet (15) like Teflon is spread over between the outer circumferential surface of the crankshaft (5) and the jaw (2) to thereby remove the oil seal body (6), wherein: the method further comprises the steps of: raising the retainer plate (1) vertically to an axis of the crankshaft (5) with its jaw (2) downwardly to press-insert the tip end of the L-shaped jaw (2) positioned at its tip end into a contact interface horizontally between the oil seal body (6) and the crankshaft (5); tilting the retainer plate (5) to a position in parallel with the axis of the crankshaft (5) to raise the jaw (2); inserting a tip (tip end (4') of a lever (4) into the hole (3) on the retainer plate (1) to retain it to the end face (5c) of a pulley shaft (5a); and removing the oil seal body (6) in an axial direction of the crankshaft (5), while retaining the jaw (2) to an inner end face of the iron core (10) on the oil seal body (6).

According to the present invention, it is unnecessary to effect the drill machining to the body of the oil seal, which has been conducted in the conventional method. Accordingly, it is possible to effect the work intact without any necessity of removing an engine or a radiator away from the vehicle body. Also, this system has an advantage in that the same retainer plate may be applied to almost all of the types of the oil seal. Accordingly, it is possible to provide an oil seal removing tool that can be used generally and is extremely low in cost. Furthermore, according to the present invention, it is possible to considerably shorten the working time. Moreover, according to the present invention, it is not necessarily preparing a number of taper screws that are suitable for different size seal diameters as in the method for screwing the taper screw into the inner diameter portion of the oil seal body 6 to remove the oil seal, thereby being capable of applying to a wide range of seal diameters with a single retainer plate 1.

Also, according to the present invention, there is employed a structure in which a Teflon sheet or the same hard sheet 15 like Teflon is spread over between the outer circumferential surface of the crankshaft 5 and the retainer plate 1, and is slidingly moved so as to remove the oil seal body 6. Employment of this structure eliminates a care for an abrasion on an outer circumferential surface of the crank shaft 5. Furthermore, according to the present invention, it is possible to use only one retainer plate 1 for the wide range of the seal diameter to ensure the versatility without necessarily preparing a number of taper screws that are suitable for different size seal diameters as in the method for inserting the taper screw into the inner diameter portion of the oil seal body 6 to remove the oil seal.

As described above, according to the present invention, it is possible to considerably enhance the working efficiency for removing the oil seal away from the crankshaft.

As described above, it goes without saying that the invention contributes to the enhancement of the repair technology of the automotive engine.

What is claimed is:

1. A method for removing an oil seal in an axial direction of a crankshaft (5), comprising:

forming symmetrical tip end portions, which are tapered toward a tip end of an over-half front portion in a longitudinal direction of an elongated plate member;

providing an L-shaped jaw (2) with side surfaces formed into arcuate portions (2a and 2a');

forming a retainer plate (1) provided with holes (3) passing through its surface in its width direction at an over-half rear portion in the longitudinal direction of said elongated plate member; and spreading a hard sheet (15) over an outer circumferential surface of the crankshaft (5) and the jaw (2) to thereby remove an oil seal body (6), wherein:

said method further comprises the steps of:

raising said retainer plate (1) vertically to an axis of the crankshaft (5) with its jaw (2) downwardly to press-insert a tip end of the L-shaped jaw (2) positioned at its tip end into a contact interface horizontally between the oil seal body (6) and the crankshaft (5);

tilting the retainer plate (1) to a position in parallel with the axis of the crankshaft (5) to raise the jaw (2);

inserting a tip end (4') of a lever (4) into the hole (3) on the retainer plate (1) to retain it to an end face (5c) of a pulley shaft (5a); and removing the oil seal body (6) in an axial direction of the crankshaft (5), while retaining the jaw (2) to an inner end face of an iron core (10) on the oil seal body (6).

* * * * *